US006858109B2

(12) United States Patent
Wroblewski, Sr. et al.

(10) Patent No.: US 6,858,109 B2
(45) Date of Patent: Feb. 22, 2005

(54) SEGMENT CUT HONEYCOMB CORE MACHINE

(76) Inventors: George T. Wroblewski, Sr., 183 W. 800 N., LaPorte, IN (US) 46350; George T. Wroblewski, Jr., 183 W. 800 N., LaPorte, IN (US) 46350; Andrew L. Wroblewski, 183 W. 800 N., LaPorte, IN (US) 46350

( * ) Notice: Subject to any disclaimer, the term of this patent is extended or adjusted under 35 U.S.C. 154(b) by 0 days.

(21) Appl. No.: 10/387,637

(22) Filed: Mar. 13, 2003

(65) Prior Publication Data

US 2004/0177929 A1 Sep. 16, 2004

(51) Int. Cl.[7] ........................................ B32B 31/00
(52) U.S. Cl. ....................... 156/264; 156/291; 156/292; 156/512; 156/518; 156/559
(58) Field of Search ................................ 156/264, 291, 156/292, 512, 518, 559

(56) References Cited

U.S. PATENT DOCUMENTS 3,257,253 A 6/1966 Hoyt
3,505,151 A * 4/1970 Sheridan .................... 156/512
4,133,712 A 1/1979 Geschwender

* cited by examiner

*Primary Examiner*—Linda Gray
(74) *Attorney, Agent, or Firm*—R. Tracy Crump

(57) ABSTRACT

A segment cut core machine is disclosed. The core machine includes five basic process stations: a roll stand; a glue station; a paper feed; a take-up station; and a core cut station. The core cut station uses a vertically oriented cutting shear with a unique beveled two-piece flying blade. The flying blade has a beveled cutting face that cuts the core stock in opposite directions from the outer edges to the center of the sheet. The beveled cutting edge reduces the "close time" of the shear and allows more core stock to be advanced into the shear. The take-up station includes a relatively flat horizontal deck and a gather adjustment gate that controls the character of the slack gathered in the sheet of core stock within the take-up station. The gate transverses over the sheet of core stock and can be shifted forward and back within the gather section of the take-up section to vary the wave length and amplitude of the gather form in the slack in the core stock. The position of the adjustment gate can be quickly and easily adjusted to address slight variation between the frequency of the shear and the speed of the paper feed.

11 Claims, 12 Drawing Sheets

SEGMENT CUT HONEYCOMB CORE MACHINE

The invention relates to a paper honeycomb core cutting machine, and in particle a segment cut honeycomb core machine that includes a vertically oriented cutting shear and an adjustable gather control mechanism.

BACKGROUND OF THE INVENTION

Paper honeycomb core is a desirable building material with a growing range of applications and uses. Paper honeycomb core can be used to make strong lightweight panels and pallets. Paper honeycomb panels are constructed of an expanded honeycomb core or web sandwiched between two paper face sheets.

Two types of machinery are used to produce paper honeycomb core: a rotary cut core machine and a segment cut core machine. Segment cut core machines are the most common and economical to operate. U.S. Pat. Nos. 3,257,253 and 4,133,172 illustrate and describe the basic design and operation of a segment cut core machine. Segment cut core machines produce honeycomb core from rolled sheets of paper stock. The core machine bonds multiple sheets of paper stock together into a continuous sheet of core stock. The core machine then feeds the core stock into a cutting mechanism or shear, which cuts the core stock into strips. As a strip of core stock is sheared off, it is pressed against the previous cut strip and bonded together to form the collapsed honeycomb core.

All segmenting type core machines operate with a certain amount of slack in the core stock entering the cutting mechanism, due to the fact that core stock is continuously fed into the cutting mechanism but the cycling of the cutting mechanism shears and stacks the honeycomb core intermittently. Consequently, segment cut core machines employ a take-up section, where the slack in the core stock gathers before moving into position to be cut. U.S. Pat. No. 3,257,253 granted to Edwin R, Hoyt describes a segment cut core machine that has a horizontally oriented cutting shear and a vertical oriented take-up section. U.S. Pat. No. 4,133, 172 granted to Robert C. Geschwender describes a segment cut core machine that has a vertically oriented cutting shear and a horizontally oriented take-up section.

Often, segment cut core machines, such as the one described in Hoyt '253 include a bow plate and "tensioners" in the take-up section. The bow plates support and guide the gathered core stock within the take-up section and the tensioners apply a gentle force to the gathered core stock, which forces it to advance into the cutting mechanism. Typically, tensioners take the form of a plurality of spring tensioned cords which overlay the core stock in the take-up section and press against the gathered slack in core stock.

Control of the gathered core stock within the take-up section and the cutting process is critical for producing uniform and consistent honeycomb core from segment cut core machines. In segment cut core machines, it is desirable to reduce the time in which the cutting mechanism is closed (the "close time") during which the core stock is gathered in the take-up section. It is also desirable to control the manner in which the slack in the core stock gathers within the take-up section in terms of a waveform, i.e. wave length and amplitude. Controlling the manner in which the core stock gathers within the take-up section ensures that the core stock is properly and consistently advanced into the cutting mechanism.

Heretofore, conventional segment cut core machines have had several operational draw backs and have generally failed to fully control the manner in which the core stock gathers within the take-up section. Conventional segment cut core machines require extensive, time consuming mechanical adjustment to set up each operational run and to maintain uniform and consistent honeycomb core. The cycle rate of the cutting mechanism must be finely matched to the speed of the core stock advancing from the paper feed to prevent too much or too little slack in the gathered core stock. When too little slack is gathered, the core stock does not advance fully into the cutting mechanism. When too much slack is gathered, the core stock jams and buckles. Paper jams due to excess slack are often the source of operational down time. Buckling the core stock can often damage the laminated sheet of core stock separating the individual piles of paper web. Mechanically matching the cutting cycle to the speed of the core stock feed is also complicated by variations in the core stock. For example, when the core stock gathers in the take-up section, the inherent stiffness in the core stock helps to forceably advance the core stock into the cutting mechanism. Because the stiffness of the core stock may vary considerably (depending on physical properties of the individual sheets of paper stock, which may vary in thickness, changes in humidity and the degree to which the sheets are wet glued), there is a tendency for the stored energy in the buckle to vary. The thickness and stiffness of the core stock also mandates that the bow plate provide a smooth sloping arc into the cutting mechanism to prevent buckling and damage to the laminated core stock. More importantly, conventional segment cut core machines have offered little means for controlling the manner and character of the slack that gathers in the sheet of core stock within the take-up section. Often core stock jams inside the cutting mechanism due to buckles and uneven folds created in the take-up section. Heretofore, the slack has been free to gather and buckle under its own influence. At best, a mechanical adjustment that affects the gathers in conventional core machines has been limited to simply adjusting the amount of force applied to the gathers by the tensioners.

SUMMARY OF THE INVENTION

The segment cut core machine of this invention provides several operational advantages over conventional segment cut core machines. This core machine can produce honeycomb core with a wider range of thickness and with a more consistent quality. The core machine of this invention includes five basic process stations: a roll stand; a glue station; a paper feed; a take-up station; and a core cut station. The core cut station uses a vertically oriented cutting shear with a unique beveled two-piece flying blade. The flying blade has a beveled cutting face that cuts the core stock in opposite directions from the outer edges to the center of the sheet. The beveled cutting edge reduces the "close time" of the shear and allows more core stock to be advanced into the shear. The beveled flying blade also reduces wear on the shear and drive motors. The take-up station includes a relatively flat deck and a gather adjustment gate that controls the character of the slack gathered in the sheet of core stock within the take-up station. The gate transverses over the sheet of core stock and can be shifted forward and back within the gather section of the take-up section to vary the wave length and amplitude of the gather formed in the slack in the core stock. The position of the adjustment gate can be quickly and easily adjusted to address slight variation between the frequency of the shear and the speed of the paper feed.

Accordingly, an advantage of this invention is that the core machine can produce continuous honeycomb core with widely varying of core thicknesses.

Another advantage is that the thickness of the honeycomb core can be readily changed without extensive adjustments to the cut station, paper feed or take-up stations.

Another advantage is that the core machine can operate with less slack in the take-up section.

Another advantage is that the cutting mechanism uses a two pieced beveled blade to reduce the load and wear on the shear, and to reduce the "close time" of the cut cycle.

Another advantage is that the take-up station includes a unique mechanical adjustment that controls the wave length and amplitude of the slack gathered in the sheet of core stock, which is used to quickly and easily address variations in the frequency of the shear and the speed of the paper feed.

Another advantage is that the core stock is fed directly from a paper feed into the cut station through a relatively short and flat take-up station, which reduces the overall size and footprint of the core machine and prevents damages to the sheets of laminated core stock.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

Figure 1:
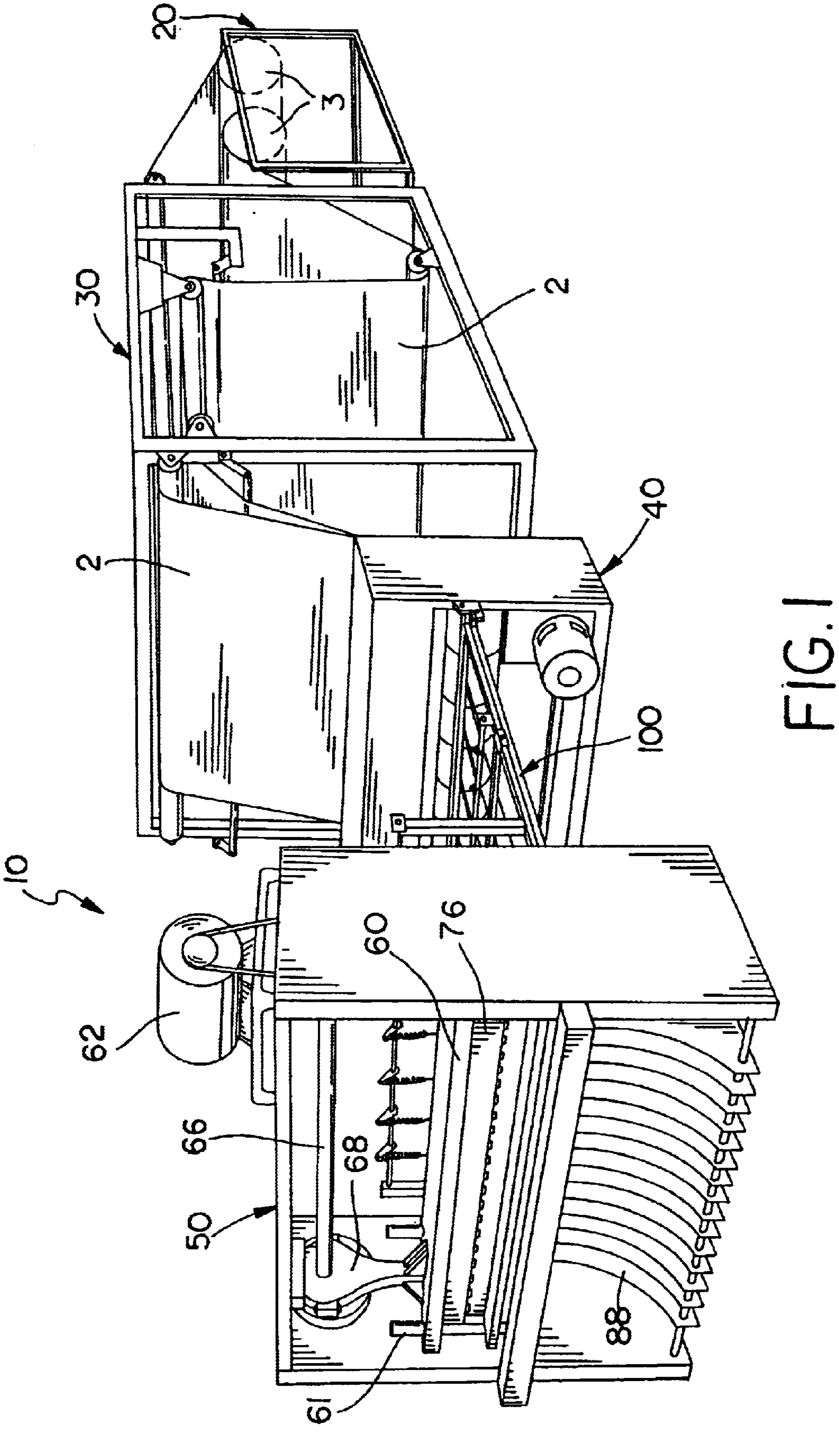
FIG. 1 is a perspective view of the segment cut core machine of this invention.

The preferred embodiment herein described is not intended to be exhaustive or to limit the invention to the precise form disclosed. It is chosen and described to best explain the invention so that others skilled in the art might utilize its teachings.

In the figures, the core machine of this invention is designated generally as reference numeral 10. The figures illustrate the core machine of this invention as a stand alone apparatus for producing continuous honeycomb core (designated generally as 6 in figures) from two sheets or webs of paper stock (designated generally as reference numeral 2 in the figures). Core machine 10 bonds the two sheets of paper stock 2 into a laminated sheet of core stock (designated as numeral 4 in figures), which is cut, stacked and compressed to form honeycomb core 6. Core machine 10 may be modified within the teachings of this invention to produce honeycomb core from a multi-ply sheet core stock. Core machine 10 is illustrated with two-ply for simplicity of description and explanation only. Core machine 10 is designed to use paper stock of various widths, but typically ranging between 72 and 96 inches. Furthermore, core machine 10 is illustrated and described as a stand alone apparatus for strictly producing honeycomb core. While shown as a stand alone apparatus, core machine can be incorporated in a complete system for producing complete honeycomb core panels within the teaching of this invention.

The operation of core machine 10 is segmented into five basic mechanical or process stations: a roll stand 20; a glue station 30; a paper feed 40, a core cut station 50; and a take-up station 100. Each station is described in detail hereafter. Core machine 10 is built on an integrated frame structure that combines the various process stations. Each process station includes a sub-frame that is connected to or is an integral part of the frame structure of core machine 10 as a whole. The process stations are connected end to end so that paper stock is fed from the roll stand at the rear of the core machine and honeycomb core emerges at the front of the core machine. Core machine 10 is illustrated in many of the figures as part schematic views in that the various frame members and support parts of the sub-frames of some the process stations have been eliminated.

Roll Stand

Roll stand 20 supports the multiple rolls of paper stock 2 from which honeycomb core 6 is produced. As shown in FIGS. 1,2,9 and 11, roll stand 20 is located at the rear end of core machine 10. Roll stand 20 has a rack style sub-frame 21 that supports the two rolls 3 of paper stock 2. The rolls of paper stock are designated in the figures separately as roll 3A and roll 3B. While shown only in partial schematic view, roll stand 20 follows conventional stand designs where each roll of paper stock is mounted on roller shafts supported by the sub-frame. Roller shafts 22 are mounted to sub-frame 21 at each end by bearing assemblies that allow the shaft and paper rolls to turn freely and with relatively low turning resistance.

Glue Station

Glue station 30 applies a plurality of glue lines 8 to the sheets of paper stock 2. Glue station 30 is built on a sub-frame 31 which supports a plurality of guide rollers 34 and 36 and glue applicators 38. Guide rollers 34 and 36 are journaled in bearing assemblies 33 supported mounted to sub-frame 31, which allow the guide shafts to turn freely. As shown, paper stock 2 for roll 3A is trained about three guide rollers 34 and paper stock 2 from roll 3B is trained about guide rollers 36. Glue applicators 38 are mounted to support arms 32 connected to sub-frame 31, which are positioned to apply a series of spaced parallel tracks or lines of glue (designated in the figures generally as 8) to paper stock 2 of roll 3B. The spaced parallel glue lines 8 transverse the entire width of the sheet of paper stock 2. Glue applicators 38 may take any conventional design and are generally well known by those skilled in the art. Glue applicators 38 are controlled by various automated controls to ensure a consistent even application of glue lines to the paper stock as they are pulled through glue station 30. As shown in the figures, glue applicators 38 apply glue lines 8 to both side of one sheet. Alternatively, glue applicators 38 may be employed and positioned to apply glue lines to the bottom surface of both sheets of paper stock as desired without deviating from the teachings of this invention. Furthermore, the position and number of the glue applicators may vary with the number of sheets of paper stock bonded together to form the core stock material, as will be recognized by one skilled in the art.

Paper Feed

Paper feed 40 pulls paper stock from rolls 3A and 3B through glue station 30 and laminates them together to form the single sheet of core stock 4. Paper feed 40 then continuously feeds core stock 4 through take-up station 100 into core cut station 50. Paper feed 40 is built on a sub-frame 41 that supports a drive motor 46 and two pinch rollers 42 and 44. Pinch rollers 42 and 44 are operatively connected to motor 46 by two gears 45 and a drive belt 47. Pinch rollers 42 and 44 transverse the entire width of paper feed 40. Pinch rollers 42 and 44 bear against each other in parallel contact and also turn in opposite directions. Consequently, the rotation of the opposed pinch rollers draws the sheets of paper stock 2 off rolls 3 in roll stand 20 and through glue station 30. Pinch rollers 42 and 44 also press the sheets of paper stock 2 together so that glue lines 8 bond both sheets together to form the laminated sheet of core stock 4. The bottom pinch roller 42 has a plurality of spaced coaxial ribs 43 (not shown) that transverse the length of the roller. Ribs 43 are spaced to be intermediate of the glue lines on the bottom of the core stock pulled through the paper feed so that pinch rollers 42 and 44 do not contact or disturb the glue lines.

Core Cut Station

Figure 2:
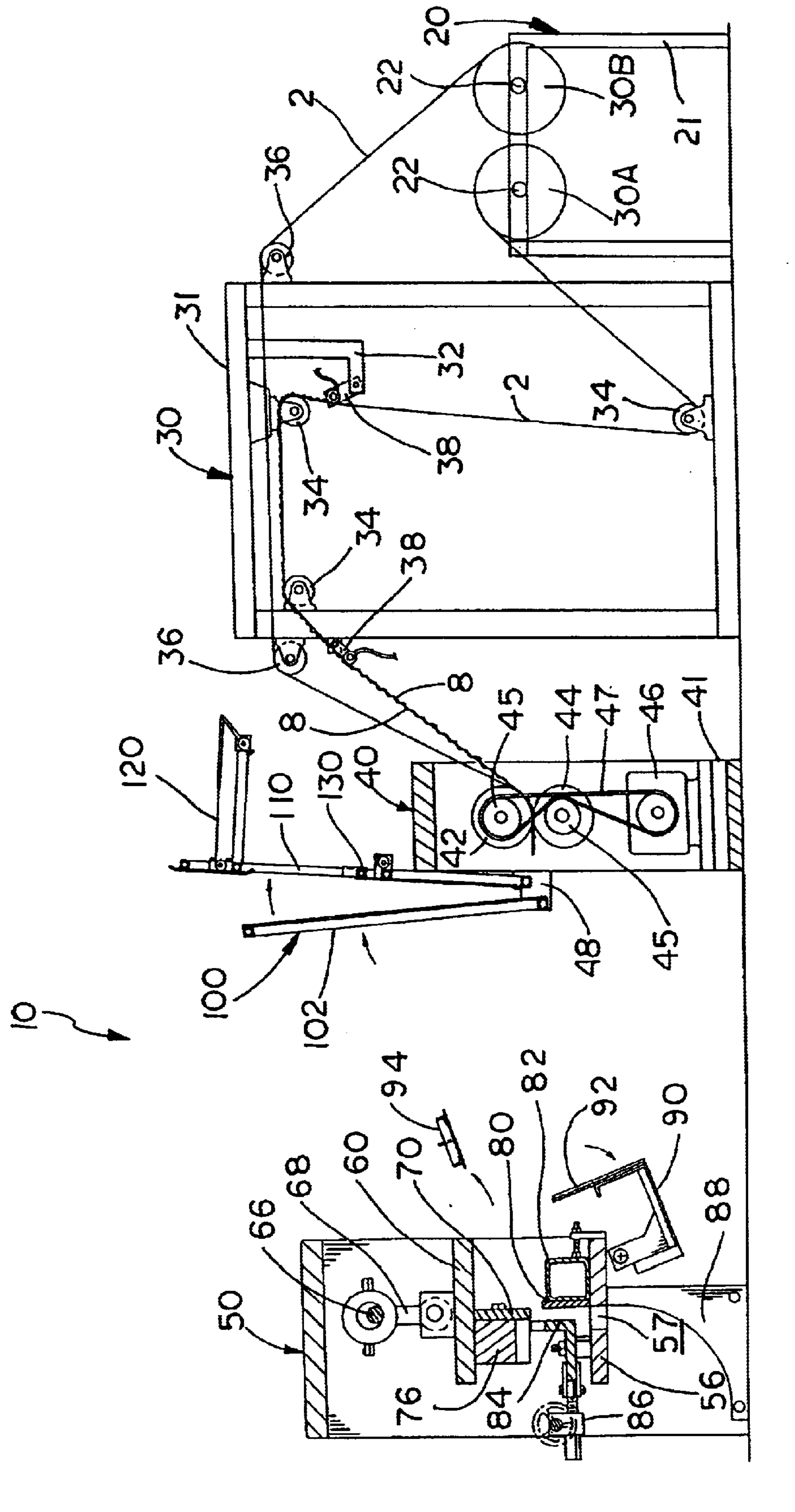
FIG. 2 is a side sectional view of the core machine of this invention.
Figure 3:
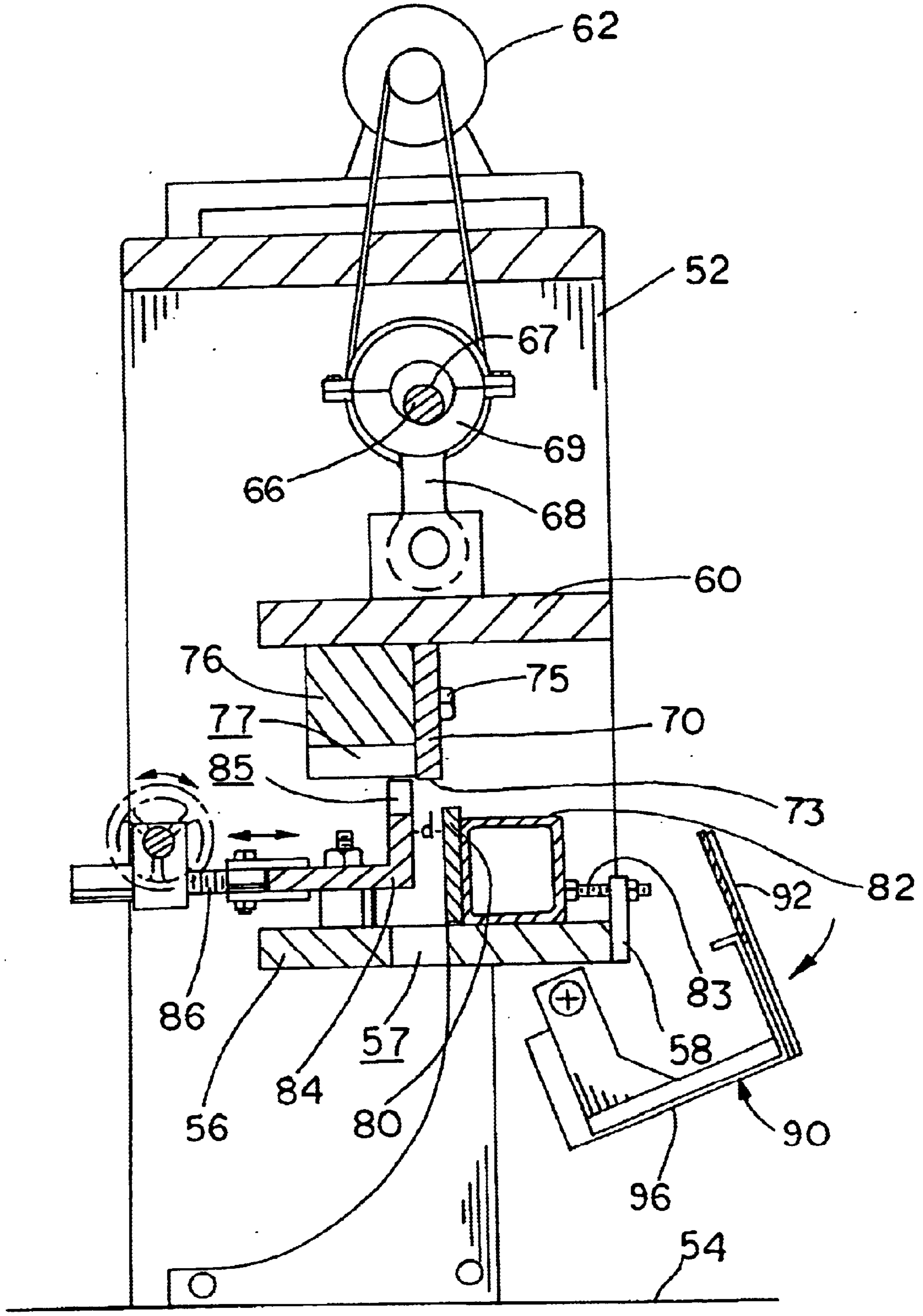
FIG. 3 is a side sectional view of the core cut station of the core machine of this invention.

Core cut station 50 cuts core stock 4 into strips 5 and packs the strips atop one another to form the continuous stack of honeycomb core 6. The internal components of core cut station 50 are best illustrated in FIGS. 2 and 3. Core cut station 50 located at the front of core machine 10 and is built on a sub-frame comprised of two upright ends 52, a top 53, floor 54 and a flat intermediate table 56. Core cut station 50 includes a vertically reciprocating carriage 60 suspended within the sub-frame. Carriage 60 is a thick flat metal platform that is suspended above table 56. As shown in FIG. 1, carriage 60 travels about four vertical cylindrical columns 61 that extend through bushings in the carriage. Columns 61 extend upward from table 56. Two connecting rods 68 operatively connect carriage 60 to a drive shaft 66. Drive shaft 66 transverses the width of the sub-frame above table 56 and is journaled in a bearing assembly (not shown in detail) at its end for rotational movement. Connecting rods 68 have a yoke 69 that holds a cam 67 through which drive shaft 66 extends. A drive motor 62 is mounted to sub-frame top 53. A drive belt 635 connects motor 62 to a gear or flywheel (not shown) mounted to drive shaft 66. Motor 62 turns drive shaft 66, which reciprocates carriage 60 up and down columns 61.

Core cut station 50 has a vertically oriented shear, which both cuts and packs the strips of core stock 4 into honeycomb core 6. The term, "the shear," is used herein to describe collectively the cutting mechanism of core machine 10. The shear of core cut station 50 includes a two piece flying blade 70 mounted to carriage 60 and a fixed blade 80 mounted to table 56. The cutting blades 70 and 80 of the shear are dimensioned to cut a variety of widths of core stock, but are typically between 72 and 96 inches long.

Figure 4:
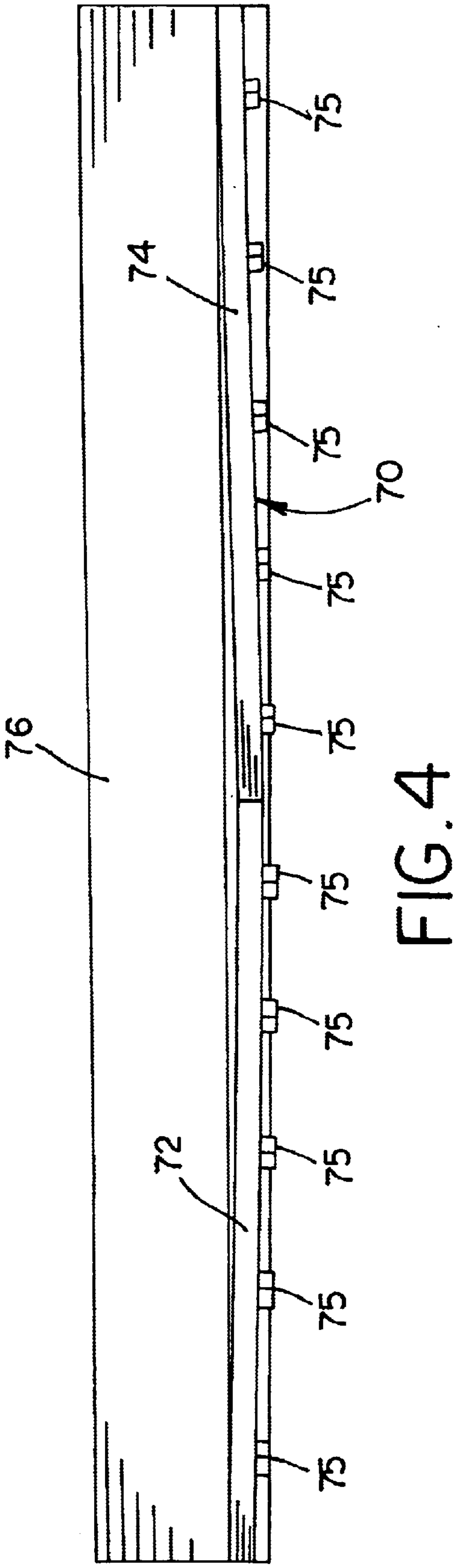
FIG. 4 is a top plan view of the flying blade and ram of the core cut station of FIG. 3.
Figure 5:
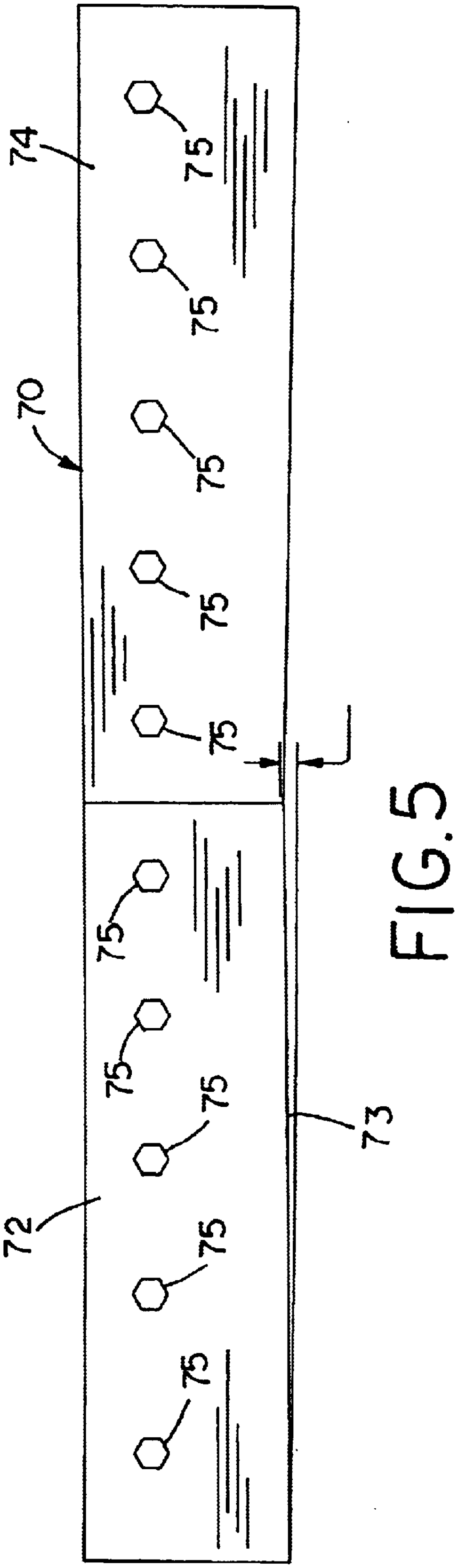
FIG. 5 is a side elevation view of the flying blade and ram of the core cut station of FIG. 3.
Figure 6:
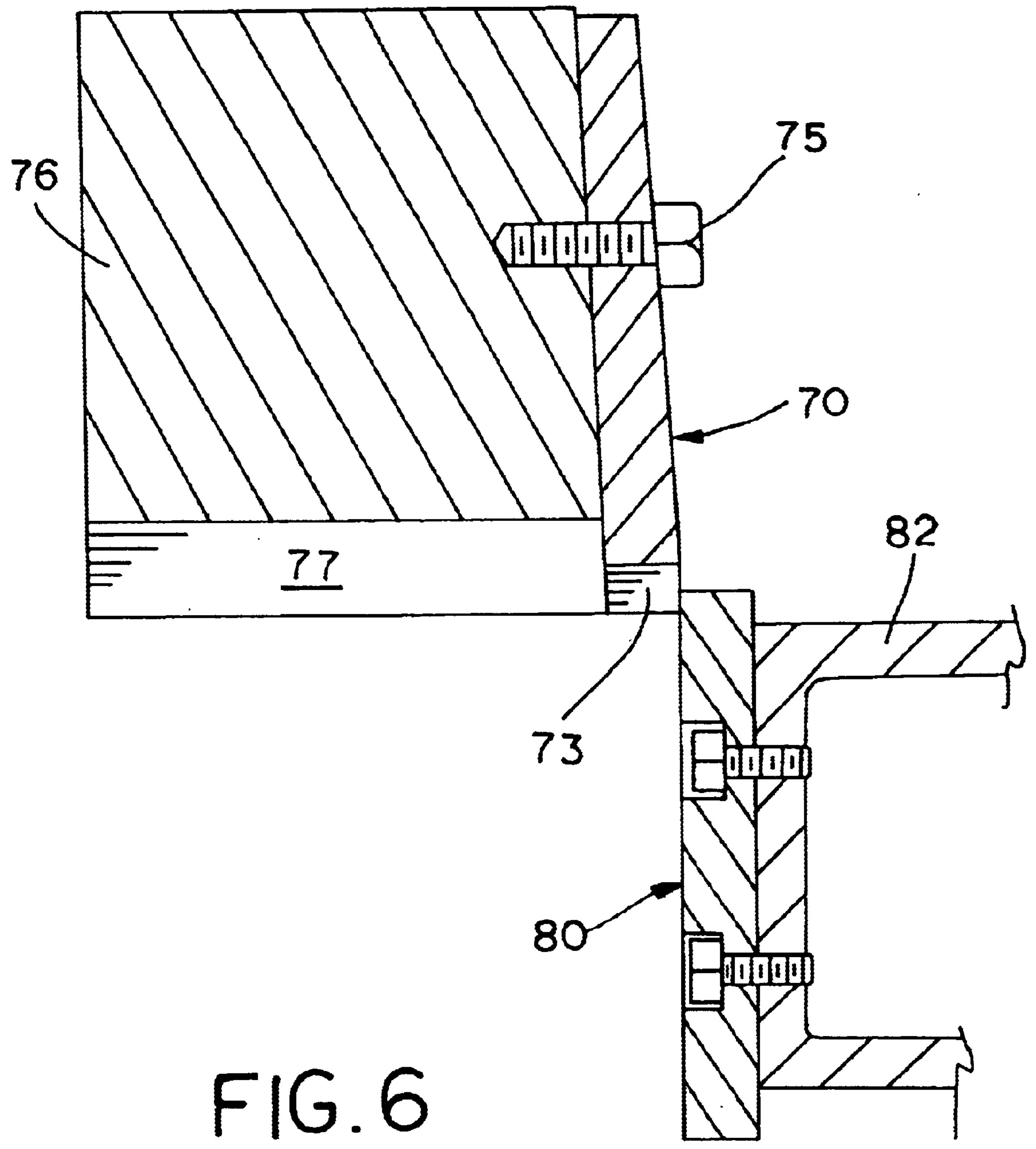
FIG. 6 is a side sectional view of the flying blade and ram of the core cut station of FIG. 3.

As shown in FIGS. 4–6, fly blade 70 has a two-piece design formed by two flat sections 72 and 74. Each blade section 72 and 74 has an angled bottom cutting face 73 so that when combined the beveled cutting face is higher at the center (best shown in FIG. 4). The beveled cutting faces 73 of flying blade 70 cuts from the outer edges in toward the center of the sheet of core stock 4. The angle of the bevel of cutting faces 73 is very slight approximately 0.25 inches of difference over the length of each blade section. Both blade sections 72 and 74 are mounted to a ram 76 mounted to the bottom face of carriage 60. Ram 76 is a solid beam that transverses the entire width of carriage 60. Flying blade 70 is bolted to the side of ram 76 by a set of fasteners 75. As shown, the bottom cutting faces 73 of flying blade 70 aligns with the bottom edge of ram 76; consequently, the bottom face of the ram is beveled to match that of flying blade 70. As best shown in FIG. 6, flying blade 70 is also mounted to ram 76 at a slight angle off of vertical so that only the edge of the cutting faces 73 contacts the side of fixed blade 80. Because of the bevel of the cutting face and the angle of the blades, blade sections 72 and 74 are mounted to ram 76 in a sweep back or snow plow orientation so that the edge of the cutting face is square to the flat fixed blade (best shown in FIG. 5). Fasteners 75 secure flying blade 70 to ram 76 and allow fine adjusts to the position of the blade sections so that the edge of the cutting faces are square to fixed blade 80. The bottom face of ram 76 has a plurality of parallel spaced square channels 77. Channels 77 are spaced laterally across the length of ram 76.

Fixed blade 80 is bolted to a blade holder 82 mounted to table 56. Blade holder 72 is a square tubular beam that transverses the width of table 56. Blade holder 72 is secured to table 56 by adjustment screws 83 that are turned through brackets 58 extending upward from table 56. Adjustment screws 83 allow blade holder 82 to slide forward and backward along table 56, so that small adjustments can be made to the alignment and position of fixed blade 80. As fixed blade 80 wears through use and sharpening, the blade holder can be shifted to properly align and square the fixed blade.

An L-shaped stop plate 84 is slidably mounted to table 56. The top edge of stop plate 84 has a plurality of square channels 85, which are intermediate of channels 77 in ram 76. As shown, channels 85 and 77 allow intermeshing between stop plate 84 and ram 76 when carriage 60 is lowered and the bottom face of ram 76 extends below the top face of stop plate 84. As shown in FIG. 2, the horizontal space between stop plate * and stationary blade 80 (designated in FIG. 2 by the letter "d") defines the vertical "throat" of the shear, which determines the width of thickness of honeycomb core 6. Stop plate 84 is connected to a set of screw shafts 86 supported by the sub-frame. Screw shafts 86 allow stop plate 84 to shift toward and away from fixed blade 80. Screw shafts 86 can be turned to shift stop plate 84 toward or away from fixed blade 80 to vary the width of throat d thereby varying the thickness of the honeycomb core. It should be noted that the upright face of stop plate 86 is angled slightly off vertical. This slight angle of stop plate 86 provides some degree of resistance for the strips of cut core stock 4 so that they can be stacked and compressed by the movement of the shear. This slight resistance is necessary during the initial startup of core machine 10 to produce tightly laminated honeycomb core until there is sufficient volume of honeycomb core to create a back pressure within throat d.

Table 56 has a long transverse discharge slot 57 directly below throat d through which the finished honeycomb core 6 passes. Beneath discharge slot 57 is a plurality of core discharge ramps 88 that are spaced parallel across the width of the sub-frame. Each core discharge ramp 88 has a curved upper face upon which the honeycomb rides. Core discharge ramps 88 are designed to mate with other conveyer systems, which transport the honeycomb core to other processing and packaging stations. For example, a conveyer typically transports the honeycomb core to a station where the core is expanded and face sheets are applied.

As shown in FIGS. 2 and 9–12, a hold down guide 90 is pivotally mounted to table 56 to guide core stock 4 into the shear. Hold down guide 90 includes a flat lower deck 92 and a removable upper deck 94, which are spaced parallel over each other approximately 0.25 of an inch. Both upper and lower decks 92 and 94 transverse the entire length of the sub-frame. Lower deck 92 has a plurality of spaced rods 93, upon which core stock 4 rides. Rods 93 are positioned to be intermediate of glue line 8 on the bottom of the sheet of core stock 4 so that the glue lines are not disturbed as the core stock enters the shear. Upper deck 94 slides into mounting brackets (not shown) rising from the ends of lower deck 72. As illustrated in FIG. 2, upper deck 94 can be removed from the guide assembly to gain access to the top of lower deck 92. Hold down guide 90 is connected to table 56 by a pair of U-shaped pivot arms 96, which allow the guide to be pivoted downward to a service position to gain access to fixed blade 80 and blade holder 82. In its operational position shown in FIGS. 10 and 12, hold down guide 90 is positioned immediately forward of the shear directly over blade holder 82. The top surface of lower deck 92 abuts against and aligns with the top edge of fixed blade 80. The bottom surface of upper deck 94 is positioned adjacent flying blade 70 and aligns with the top edge of stop plate 84.

Take-Up Station

Figure 7:
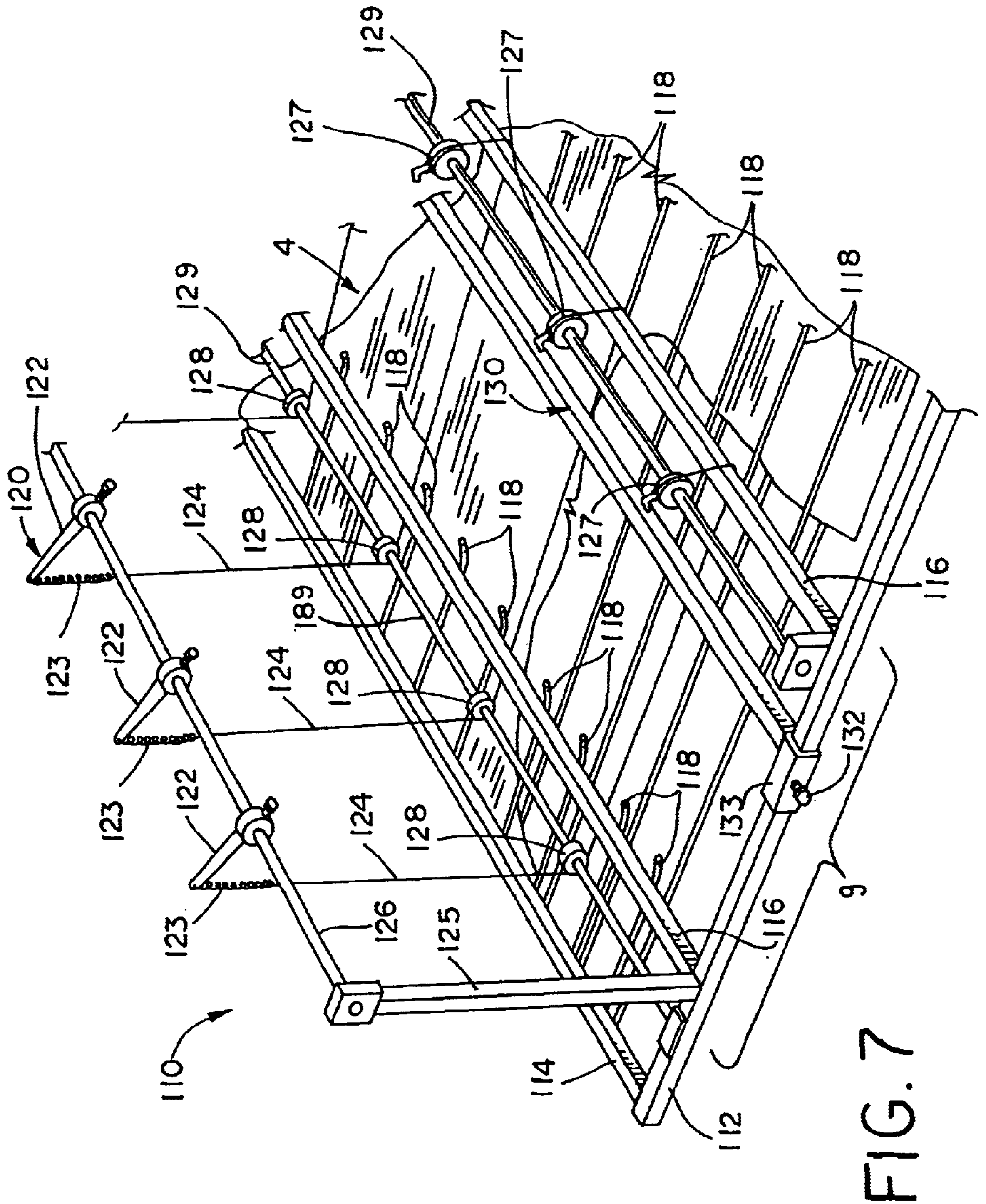
FIG. 7 is a partial perspective view of the take-up station of the core machine of this invention.
Figure 8:
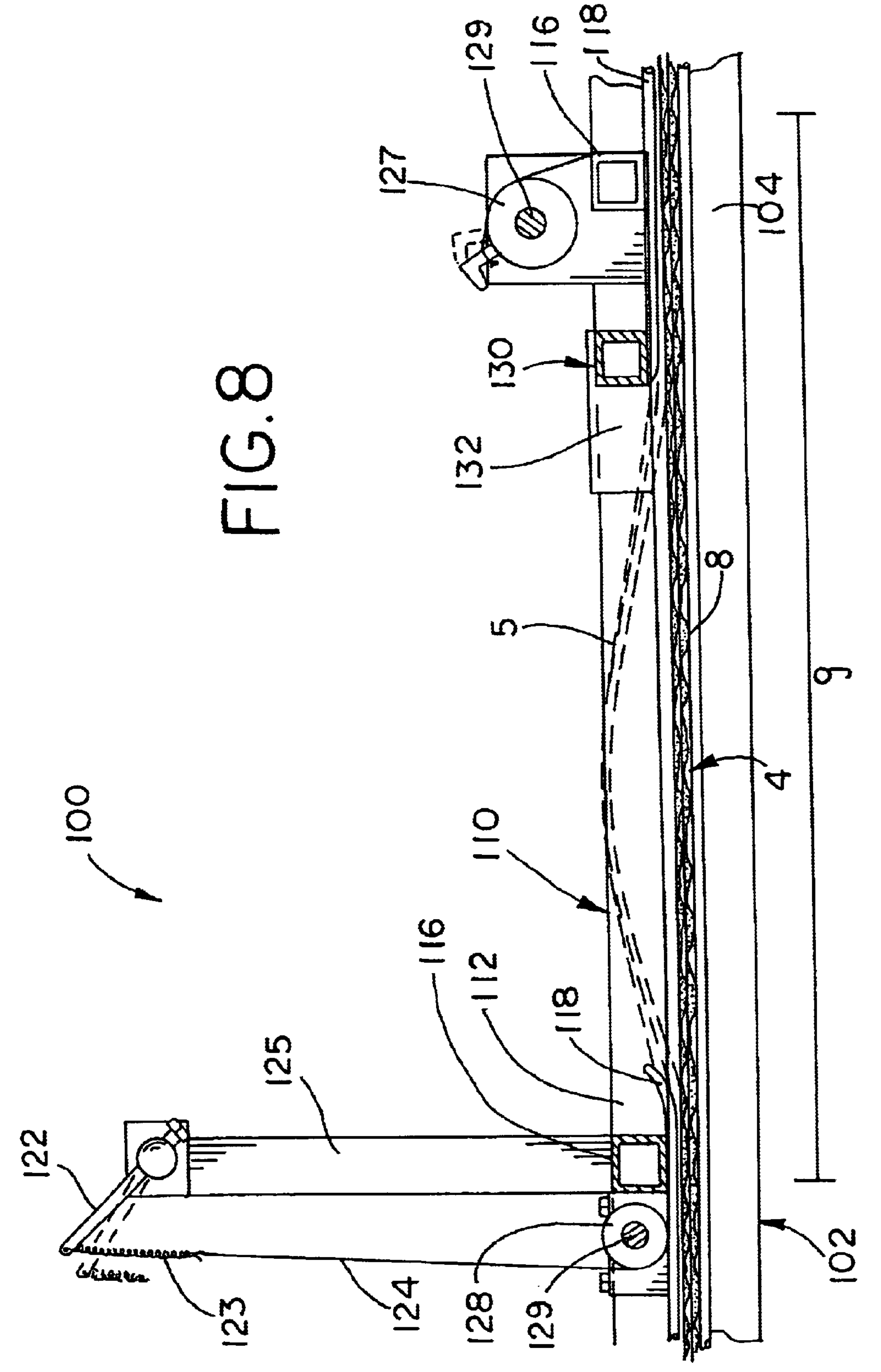
FIG. 8 is a side sectional view of the take-up station of FIG. 7.
Figure 9:
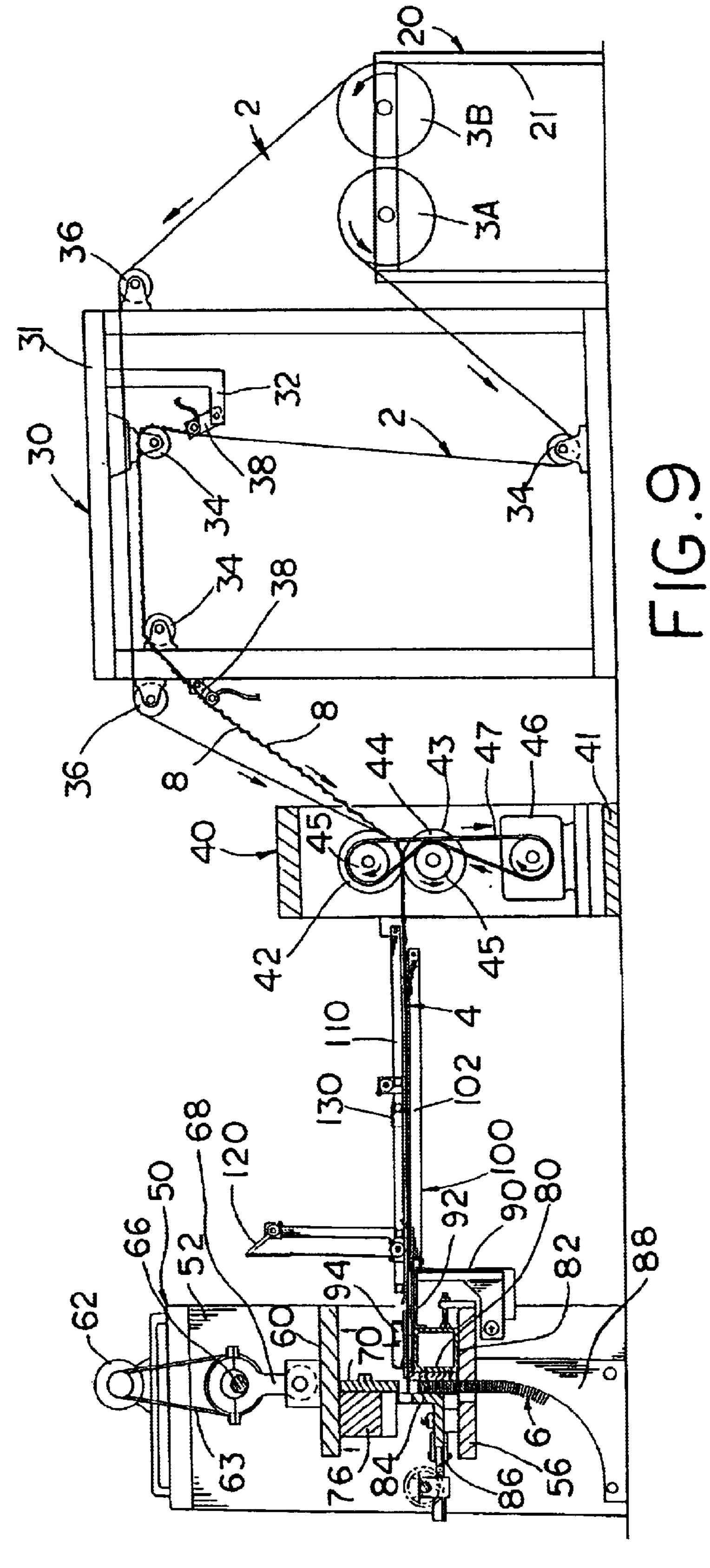
FIG. 9 is a side sectional view of the core machine of this invention illustrating the shear at the top of the cut cycle.
Figure 10:
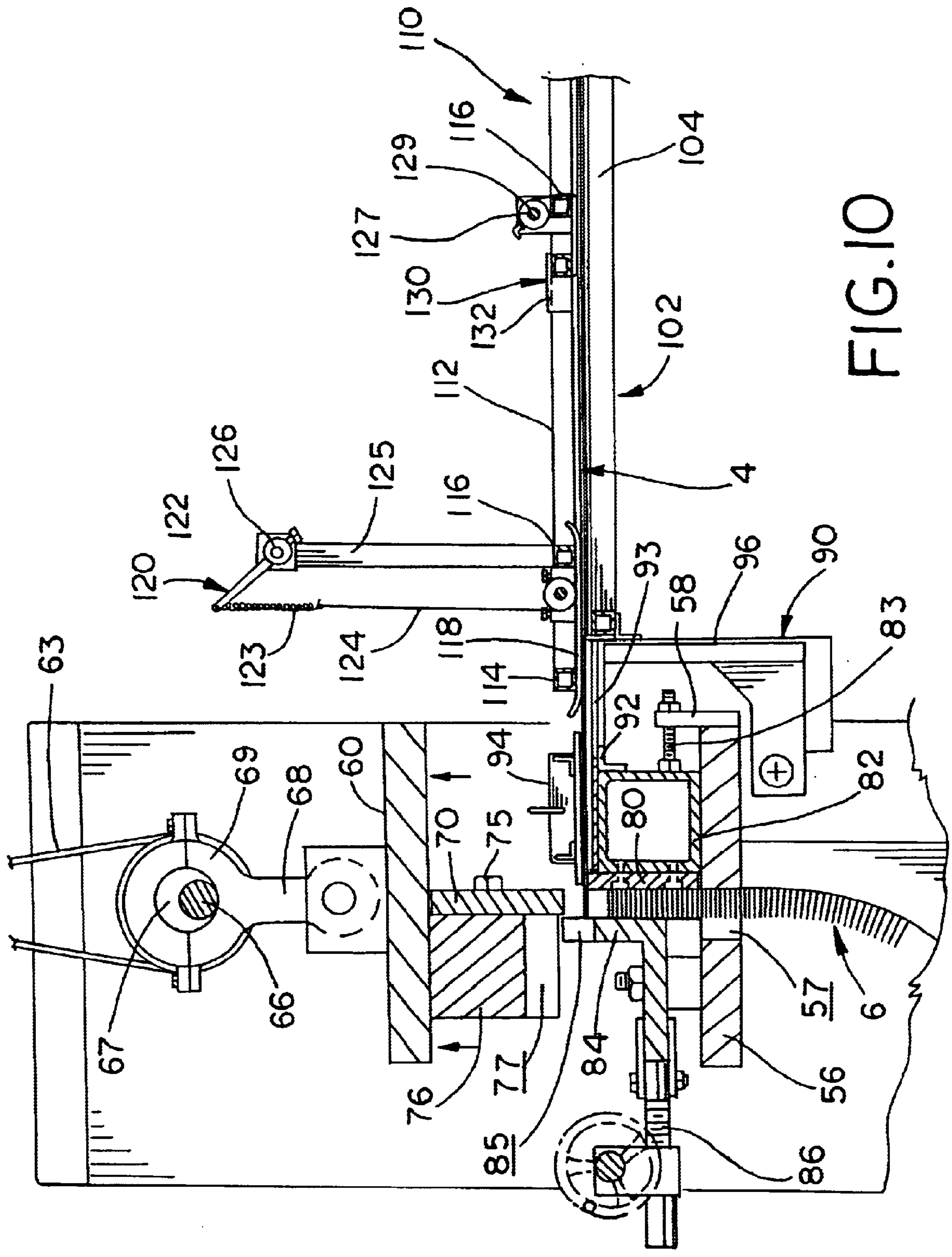
FIG. 10 is a side sectional view of the core cut station (a magnified view of FIG. 9) illustrating the shear at the top of the cut cycle.
Figure 11:
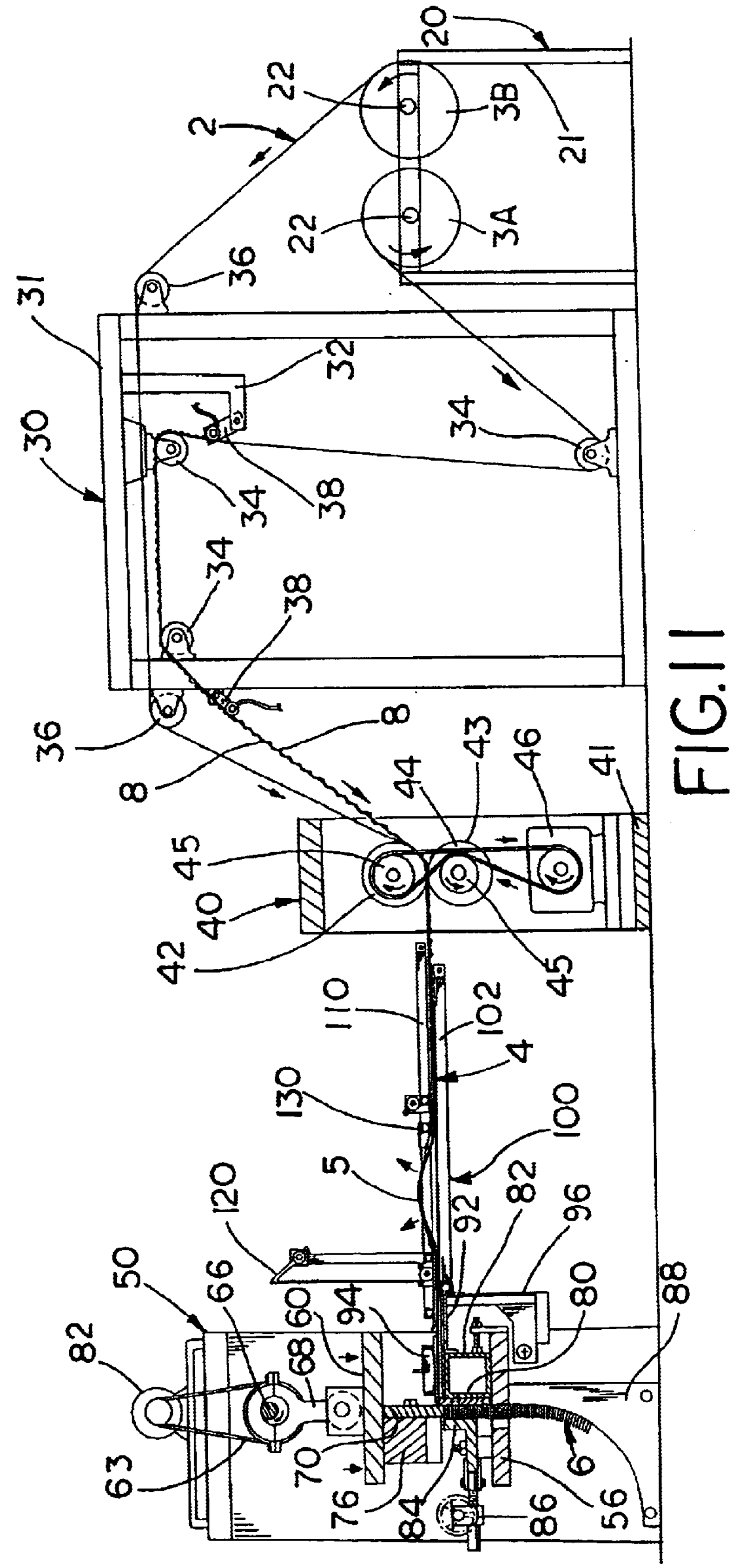
FIG. 11 is a side sectional view of the core machine of this invention illustrating the shear at the bottom of the cut cycle.
Figure 12:
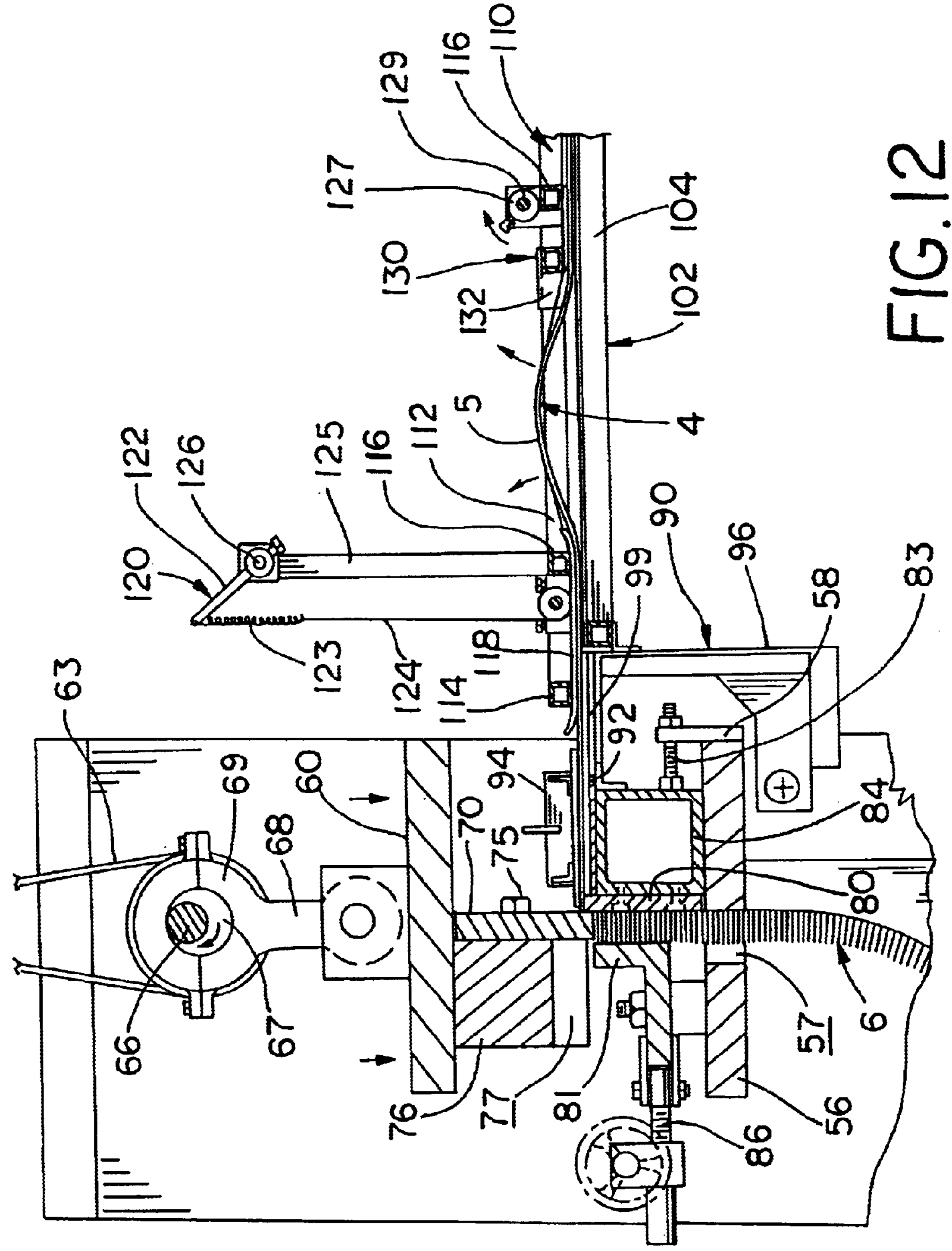
FIG. 12 is a side sectional view of the core cut station (a magnified view of FIG. 9) illustrating the shear at the bottom of the cut cycle.
Figure 13:
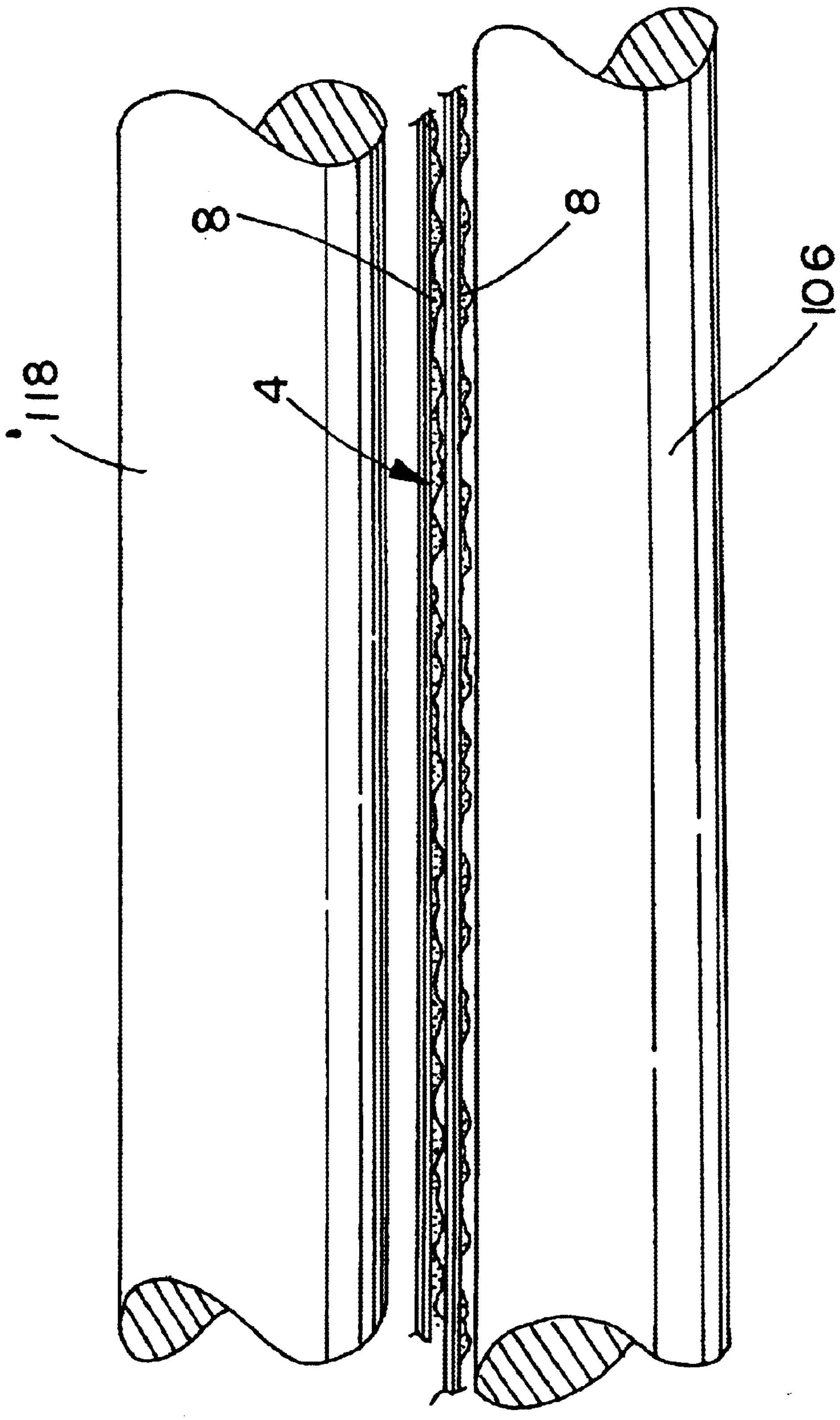
FIG. 13 is a side sectional view of the area of FIG. 10 magnified to illustrate the take-up station and core stock.

Take-up Station 100 is used to control the slack gathered in the sheet of core stock (generally referred to as the "gather" and designated in the figures generally as numeral 5) and to ensure that core stock 4 is properly fed into core cut station 50. Take-up station 100 is supported by sub-frame 41 of paper feed 40. The take-up station 100 includes an upper and lower deck 102 and 110, which is pivotally mounted to sub-frame 41 of paper feed 40 by two brackets 48. As shown in FIG. 2, both decks 102 and 110 can be pivoted upward to allow access to the components of core cut station 50. Lower deck 92 is composed of an outer frame 104 and a plurality of spaced parallel deck rods 106. Deck rods 106 are spaced intermediate of the glue lines 8 on the sheet of core stock 4, which allows lower deck 102 to support the core stock 4 while not contacting or interfering with the glue lines as the core stock is advanced into core cut station 50. As shown in FIG. 7, upper deck 110 formed by an outer frame composed of side rails 112 and end members 114. Two intermediate cross members 116 transverse the frame and are connected between side rails 112. The space between cross members 116 form a gather section (designated in FIGS. 7, 8, 10 and 12 by reference letter "g"). A plurality of rods 118 are used as fingers or guides at both ends of upper deck 110 that guide core stock through take-up station 100.

Take-up station 100 includes a plurality of gather tensioners 120, which apply a downward force to gather 5, which forms in gather section g during operation. Each tensioner 120 consist of a pivotally adjustable lever arm 122, a coil spring 123, and a length of cord 124. Cords 124 is a standard nylon cord of the type used for lawn trimmers, but any durable non-stretch cord, wire or string can employed. Lever arms 122 are secured to a cross member 126 suspended between two uprights 125 mounted to frame side rails 112. Lever arms 122 are mounted to cross member 126 by set screws, which allow the lever arms to rotate about the cross member. One end of each coil spring 123 is connected to lever arm 122 and the other end is connected to cord 124. Cord 124 is trained around a pulley 128 mounted to a cross shaft 129 and the forward intermediate cross member 116. The other end of cord 124 is secured and tied to an end pulley 127 mounted on another cross shaft 129. Lever arms 122 can be rotated to increase or decrease the tension exerted on cords 124 by coil springs 123.

Take-up station 100 also includes a gather adjustment gate 130, which is used to adjust the wave length of gather 5. Gate 130 transverses the entire width of gather section g and is mounted to frame side rails 112 by two tubular end sleeves 132 for shiftable movement along the length of the gather section g. A set screw 133 is turned into a threaded bore in sleeves 132 to selectively secure adjustment gate 130 at various positions along the length of gather section g.

Operation

The operation of core machine 10 can now be described in detail. FIGS. 9–12 best illustrate the operation of core machine 10. Paper feed 40 continuously pulls sheets of paper stock 2 from rolls 3 through glue station 30. As shown, glue applicators 38 apply parallel glue lines 8 to both sides of the sheet of the paper stock from roll 3A. Pinch rollers 42 and 44 compress the sheets of paper stock 2 together, which bonds them together to form the single two plied laminated sheet of core stock 4. Paper feed 40 also feeds the laminated sheet of core stock 4 through take-up station 100 into core cut station 50.

Core stock 4 advances between the upper and lower decks 102 of the take up station 100 and passes between the upper and lower decks 92 and 94 of the hold down guide 90 before advancing into the shear of core cut station 50. Hold down guide 90 holds and guide core stock 4 into the shear. At the top of the carriage stroke, core stock 4 is pushed forward so that its leading edge abuts against stop plate 84. As carriage 60 lowers flying blade 70 cuts a strip 5 of core stock 4 off and the bottom face of ram 76 compresses the newly sheared strop against the previously cut strips in succession. Glue lines 8 on the bottom face of the sheared strips of core stock 4 bond to the top face of the previously sheared strips, which form the honeycomb core 6. With each cycle of shear, additional strips of core stock 4 are bonded to honeycomb core 6, which is extrude from throat d and expelled through discharge slot 57 in table 56.

While paper feed 40 continuously pushes core stock 4 forward, core stock is advanced into the shear of core cut station 50 intermittently due to the cyclic operation of the cutting mechanism. When flying blade 70 is in contact with fixed blade 80 (the bottom portion of the cut stroke), forward progression of core stock 4 is momentary halted. As paper feed 40 continues to push core stock 4 forward, gather 5 rises within gather section g of take-up station 110. Tensioners 120 and gather adjustment gate 130 control the size, character and formation of gather 5. Gather adjustment gate 130 is positioned within the gather section g to adjust the form and characteristic of gather 5. The characteristic of gather 4 is described in terms of a waveform, i.e., "wave length" and "amplitude." Moving adjustment gate 130* forward toward the cut station shortens the "wave length" and increases the amplitude of gather 5. Moving the adjustment member back toward paper feed * lengthens the "wave length" and decreases the "amplitude" of gather 5. Gather 5 rises upward off of lower deck 102, but is held down by cords 124 of tensioners 120. Tensioners 120 apply a uniform downward force to gather 5, which maintains the shape of the gather and advances core stock 4 into the shear when flying blade 70 moves out of contact with fixed blade 80 (he top portion of the cutting stroke). Tensioners 120 provide a uniform downward force across the width of the sheet of core stock 4, so that the core stock advances evenly into the shear. This assures that strips of core stock are evenly cut and that the honeycomb core is of consistent thickness. Tensioners 120 which are spaced across the entire width of the sheet of core stock 4 also help maintain the symmetry of the wave form of gather 5 across the width of the sheet of core stock 4.

Advantages

One skilled in the art will note several advantages of the core machine of this invention over conventional segment cut core machines. Core machine 10 can be used to produce honeycomb core with a greater range of core widths than conventional segment cut core machines. Core machine 10 can produce honeycomb ranges between 0.5–6.0 inches. Core machine 10 also operates more efficiently and at higher cut cycle rates than conventional segment cut core machines. The performance advantages are created by the two piece tapered flying shear blade of the core cut station and the gather adjustment gate of the take-up station.

The take-up station allows simple mechanical adjustments to control the character (size and shape) of the gather formed in the sheet of core stock, as well as, the amount of force applied to the gather by the tensioners. For simplicity of explanation, the character of the gather in the sheet of core stock is described in terms of a wave form with a wave length (the amount of slack gathered in the gather section) and amplitude (the distance that the slack raises up from its resting horizontal plane). By adjusting the position of the gather adjustment gate along the length of the gather section g, the wave length and ampitude of the gather can be adjusted. For any given speed of the paper feed, sliding the adjustment gate towards the paper feed produces a gather having a longer wave length with greater amplitude. Sliding the gate toward the core cut station produces a shorter wave length with a higher amplitude. When the amplitude of the gather increases, the tensioners apply increased downward force to the gather, which urges the gather forward into the shear quicker with each cut cycle. Consequently, more core stock can be advanced into the shear with each cut cycle allowing honeycomb core of greater widths. The adjustment gate can be quickly and easily positioned along the gather section of the take-up station. The ease of adjustment eliminates time consuming and complicated mechanical adjustment required by conventional segment cut core machines. Slight variation between the frequency of the shear and the speed of the paper feed can be address by adjustments to the position of the adjustment gate. These adjustments can also be made while the core machine operates, thereby further reducing operational down time.

The two piece design of the flying blade provides significant performance contributions. The beveled cutting face of the flying blade cuts the core stock in opposite directions from the outside edge of the sheet to the center with a single stroke. Because the shear cuts the core stock from two directions, the "close time" (the time required the entire width of the sheet and thereby the time during which the slack in the core stock gathers) is reduced by half. Reducing the "close time" reduces the amount of slack in the core stock gathered in the take-up station and allows more "open time" for the core stock to be advanced into the shear. With greater "open times" less force from the tensioners is required to properly advance the core stock into the shear.

The design of the core machine also allows for efficient operation and convenient maintenance. The components of the various operational stations are readily accessible for repair and maintenance. The upper and lower decks of the take-up station pivot to allow access to many of the components of the core cut station. The two-pieced beveled flying blade reduces the load on the drive components, which improves the efficiency of the cutting mechanism. Consequently, the core machine can operate at higher production speeds without jamming or sacrificing the quality or consistency of the honeycomb core produced.

The vertical orientation of the shear and the horizontal orientation of the take-up section reduces the over-all size and footprint of the core cut machine. The use of the gather gate adjustment eliminates the need for large curved bow plates in the take-up section, which greatly reduces the size and footprint of the machine. The relatively short and flat horizontal take-up station ensures that the sheets of laminated core stock are not damaged by being excessively bent while being advanced into the shear.

It is understood that the above description does not limit the invention to the details given, but may be modified within the scope of the following claims.

We claim:

1. A segment cut core machine for producing continuous honeycomb core from a plurality of sheets of paper stock, the core machine comprising:

means for bonding together the sheets of paper stock to form a continuous sheet of laminated core stock by applying a first plurality of adhesive lines between opposite faces of the sheets of paper stock extending longitudinally of the sheets of paper stock and spaced transversely across the sheets of paper stock and by applying a second plurality of adhesive lines on one of the outside faces of the sheet of core stock;

core cut means for cutting the sheet of core stock into successive strips of core stock and for pressing the strips of core stock together atop one another so that the second plurality of adhesive lines bonds the strips of core stock together to form the continuous honeycomb core;

paper feed means spaced from the core cut means for continuously feeding the sheet of core stock into the core cut means; and take-up means extending between the core cut means and paper feed means for supporting the sheet of core stock atop thereof as the sheet of core stock travels from the paper feed to the core cut means, the core cut means includes a reciprocating shear for transversely cutting the sheet of core stock into the strips of core stock in a cyclic operation, such that the sheet of core stock being continuously fed from the paper feed means intermittently accumulates in a gather rising atop the take-up means whereby the gather has a waveform with an amplitude and a wave length, the take-up means includes a deck upon which the sheet of core stock travels between the paper feed means and the core cut means, means for applying force to the gather to advance the sheet of core stock in the core cut means, a cross member mounted to the deck, and a gate shiftably mounted to the deck for horizontal movement between selectable positions along the length of deck, the cross member and gate also extending transversely over the sheet of core stock traveling upon the deck and being spaced apart from each other so that the gather rises up from the deck between the cross member and gate, the cross member and the gate constituting means for selectively adjusting the gather to alter the gather wave form.

2. The core machine of claim 1 wherein the force applying means includes a length of cord trained between the cross member and the gate and a spring for tensioning the length of cord, the cord overlying the sheet of core stock between the cross member and the gate so as to contact the gather when the gather rises up from the deck.

3. The core machine of claim 1 wherein the shear includes a first blade for transversely cutting in opposites directions the sheet of core stock into strips of core stock.

4. The core machine of claim 3 wherein the first blade includes a flat elongated first blade section and a flat elongated second blade section, each of the first blade section and the second blade section has an angled cutting face, the first blade section and the second blade section connected end to end so that the cutting face of the first blade section and the cutting face of the second blade section diverge together at the center of the first blade.

5. The core machine of claim 3 wherein the core cut means includes a flat table, a carriage suspended above the table, means for reciprocating the carriage toward and away from the table, the shear also includes a second blade positioned for slidable reciprocal movement past the first blade, one of the first blade and second blade mounted to the table and the other of the first blade and the second blade mounted to the carriage so that reciprocating the carriage moves the second blade past the first blade in a cutting relationship.

6. The core machine of claim 1 wherein core cut means also includes means for selectively adjusting the width of the strips of core stock cut from the sheet of core stock by the shear.

7. A segment cut core machine for producing continuous honeycomb core from a plurality of sheets of paper stock, the core machine comprising:

means for bonding together the sheets of paper stock to form a continuous sheet of laminated core stock by applying a first plurality of adhesive lines between opposite faces of the sheets of paper stock extending longitudinally of the sheets of paper stock and spaced transversely across the sheets of paper stock and by applying a second plurality of adhesive lines on one of the outside faces of the sheet of core stock;

core cut means for cutting the sheet of core stock into successive strips of core stock and for pressing the strips of core stock together atop one another so that the second plurality of adhesive lines bonds the strips of core stock together to form the continuous honeycomb core;

paper feed means spaced from the core cut means for continuously feeding the sheet of core stock into the core cut means; and take-up means extending between the core cut means and paper feed means for supporting the sheet of core stock atop thereof as the sheet of core stock travels from the paper feed to the core cut means, the core cut means includes a reciprocating shear for transversely cutting the sheet of core stock into the strips of core stock in a cyclic operation, such that the sheet of core stock being continuously fed from the paper feed means intermittently accumulates in a gather rising atop the take-up means whereby the gather has a waveform with an amplitude and a wave length, the shear includes a first blade for transversely cutting in opposites directions the sheet of core stock into strips of core stock, the first blade includes a flat elongated first blade section and a flat elongated second blade section, each of the first blade section and the second blade section has an angled cutting face, the first blade section and the second blade section are connected end to end so that the cutting face of the first blade section and the culling face of the second blade section diverge together at the center of the first blade.

8. The core machine of claim 7 wherein the take-up means includes a deck upon which the sheet of core stock travels between the paper feed means and core cut means, means for applying force to the gather to advance the sheet of core stock in the core cut means, a cross member mounted to the deck, and a gate shiftably mounted to the deck for horizontal movement between selectable positions along the length of deck, the cross member and gate also extending transversely over the sheet of core stock traveling upon the deck and being spaced apart from each other so that the gather rises up from the deck between the cross member and gate, the cross member and the gate constituting means for selectively adjusting the gather to alter the gather wave form.

9. The core machine of claim 8 wherein the force applying means includes a length of cord trained between the cross member and the gate and a spring for tensioning the length of cord, the cord overlying the sheet of core stock between the cross member and the gate so as to contact the gather when the gather rises up from the deck.

10. The core machine of claim 7 wherein the core cut means includes a flat table, a carriage suspended above the table, means for reciprocating the carriage toward and away from the table, the shear also includes a second blade positioned for slidable reciprocal movement past the first blade, one of the first blade and second blade mounted to the table and the other of the first blade and the second blade mounted to the carriage so that reciprocating the carriage moves the second blade past the first blade in a cutting relationship.

11. The core machine of claim 7 wherein core cut means also includes means for selectively adjusting the width of the strips of core stock cut from the sheet of core stock by the shear.

* * * * *